United States Patent [19]
Main et al.

[11] 3,935,807
[45] Feb. 3, 1976

[54] AUTOMATIC BAKING APPARATUS

[75] Inventors: Bertyl L. Main, Spokane; Richard G. Garmire, Kirkland, both of Wash.

[73] Assignee: G & M Enterprises, Kirkland, Wash.

[22] Filed: July 10, 1974

[21] Appl. No.: 487,312

[52] U.S. Cl. .............................. 99/352; 99/443 C
[51] Int. Cl.² ............................................ A21B 5/06
[58] Field of Search ............ 99/352, 345, 348, 349, 99/385, 389, 390, 391, 392, 443, 447; 118/16, 17, 24, 25; 198/110; 222/510

[56] References Cited
UNITED STATES PATENTS

| | | | |
|---|---|---|---|
| 2,119,910 | 6/1938 | Ferry | 99/352 |
| 2,472,650 | 6/1949 | Curlee | 118/25 |
| 2,932,263 | 4/1960 | Leuthauser | 99/352 |
| 3,026,824 | 3/1962 | Reach | 99/352 |
| 3,110,391 | 11/1963 | Warren | 198/110 |
| 3,164,490 | 1/1965 | Evanson et al. | 118/25 |
| 3,340,824 | 9/1967 | Talbot | 118/25 X |
| 3,347,153 | 10/1967 | Sutton | 99/391 X |
| 3,394,665 | 7/1968 | Williams | 118/24 |

*Primary Examiner*—Daniel Blum
*Assistant Examiner*—Arthur O. Henderson
*Attorney, Agent, or Firm*—Cole & Jensen

[57] ABSTRACT

A machine for baking a bakery product such as soft pretzels, wherein the machine includes an oven-like chamber containing a number of processing stations and means to automatically move the bakery products through each processing station in turn. The bakery products are initially placed on one of a plurality of support means, such as baking racks, the opposite ends of which are pivotally connected between parallel, positively driven endless drive chains. The endless drive chains are supported and driven through a predetermined path which exposes the bakery products positioned on the baking racks to the individual processing stations in a predetermined sequence. The first processing station includes a spraying means, which partially coats the bakery products with a soda solution. The bakery products are next salted by a rotating salt cylinder, and then are baked and browned by a selected arrangement of radiant heat rods, before being removed from the baking racks.

14 Claims, 5 Drawing Figures

AUTOMATIC BAKING APPARATUS

BACKGROUND OF THE INVENTION

This invention relates to the art of automatically baking a bakery product, wherein the bakery products are sequentially passed through a series of processing stations.

The large soft pretzel is currently being sold at sporting and other entertainment events, as well as in the more traditional small stands and restaurants. The pretzels are supplied to the vender in a raw and frozen form, and must be processed and baked before they are edible. Since such pretzels are most desirable when warm, portable pretzel baking machines have been developed which process the frozen pretzels into an edible form at concessionaire stands in stadiums, convention centers, or the like. Heretofore, however, such prior art machines have attempted to submerge the pretzels in the soda solution as a first step in their processing, which has caused delays in the processing, inefficient use of the soda solution, and frequently results in the pretzels floating off the racks and being wetted only on a lower surface portion thereof. This results in pretzels which are not properly browned, detracting from their appearance, and which are soggy from an excess of solution.

Additionally, prior art machines have used an arrangement of heating rods for baking which directly affect only the upper surface of the pretzels, resulting in finished pretzels which are slightly overbaked on the upper surface, and underbaked on the lower surface.

In view of the above, it is an object of the present invention to provide a baking apparatus wherein the baking of bakery products such as pretzels may be stopped and the bakery products recovered once processing is begun.

Another object of the present invention is to provide a baking apparatus which provides an improved means for quickly and uniformly salting the individual bakery products.

It is another object of the present invention to provide a baking apparatus wherein the initial processing of the bakery products may be accomplished without dipping the bakery products in a solution.

It is a further object of the present invention to provide a baking apparatus wherein the bakery products are baked quickly and uniformly.

It is yet another object of the present invention to provide a baking apparatus wherein the individual bakery products are processed and ready to eat in a minimum amount of time.

SUMMARY OF THE INVENTION

According to the invention, a housing is provided which includes an oven-like chamber therein, the chamber having a pair of power-driven belts mounted therein in such a manner that they are rotatable in spaced parallel vertical planes, the drive belts being oppositely disposed and arranged such that they include substantially horizontal segments and substantially vertical segments, which are interconnected by connecting segments which are oblique substantially along their entire length, with the horizontal segments being disposed above the vertical segments and the connecting segments. A plurality of carrier racks are interposed between the belts, and are swingably supported at spaced points along the belts such that a surface of the baking racks extending between the belts is maintained in a substantially horizontal disposition as the racks are rotated in conjunction with the belts. The racks are so configured as to provide support for a bakery product such as a soft pretzel as the racks are rotated with the belts. Within the housing is positioned a spraying means which is located near the bottom of the vertical segments of the belts and which sprays the bakery products placed on the racks with a solution. Positioned at a point subsequent to the salting point in the course of travel of the bakery product is a salting means for salting the upper surface of the bakery product. Dual baking means are disposed above and below the course of travel of the bakery products on the racks at a point subsequent to the salting point.

More specifically, the spraying means includes a hollow elongated tube having a plurality of spaced openings along its length, into which tube is injected under pressure a caustic soda solution, the solution then being expelled from the tube onto a surface of the bakery product. The hollow tube is disposed substantially parallel with the carrier racks and extends between the belts at a point relative to the course of travel of said racks such that said racks pass directly beneath the elongated tube.

The dual means includes a plurality of heating elements which are positioned a predetermined distance above and below the horizontal segments of the belts and are disposed between the belts, the heating elements specifically including infra-red quartz heating rods disposed above the horizontal segments and emitting radiation which in addition to baking the bakery products on the racks reacts with the solution thereon to brown the bakery products.

The salter means is adapted to be selectively coupled to a drive mechanism which powers the belts for rotation of the salting means. The coupling means includes a set of coplanar gears, one gear being positively driven by the drive mechanism, the other gear being rigidly secured to one end of the salter means, said one end of the salter means being adapted to be selectively raised and lowered by the operator sufficiently to either engage the two gears for rotation of the salter or to disengage the two gears, in which case the salter means remains stationary.

DESCRIPTION OF THE DRAWINGS

A more thorough understanding of the invention may be obtained by a study of the following detailed description taken in conjunction with the accompanying drawings in which.

DESCRIPTION OF THE PREFERRED EMBODIMENT

Figure 1:
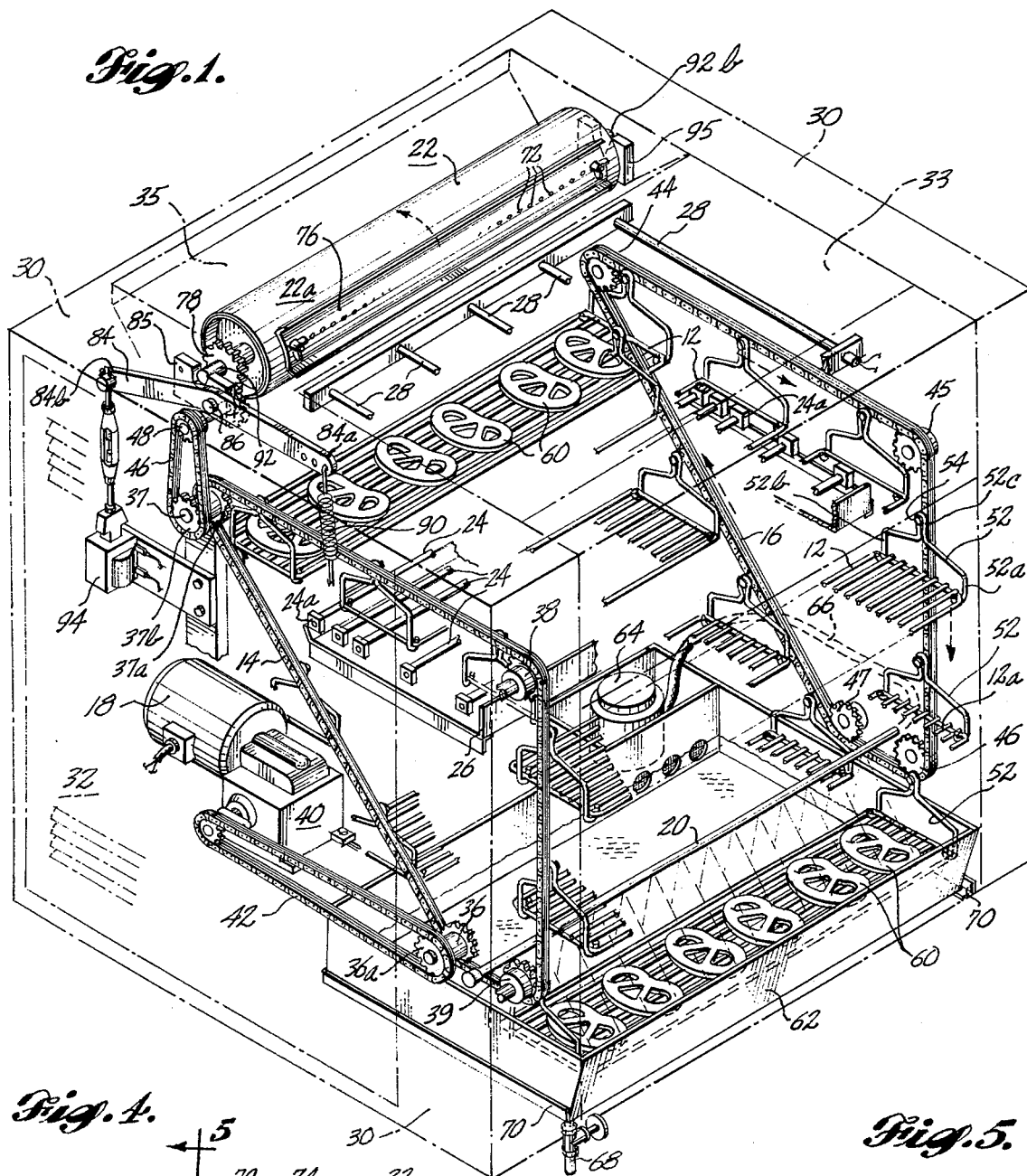
FIG. 1 is an isometric view of a pretzel baking apparatus embodying the novel features of the present invention.

Referring to FIG. 1, bakery products such as frozen soft pretzels are introduced into the baking apparatus by placing them on a baking rack presented at the front of the apparatus, e.g. baking rack 12, which is one of preferably a plurality of such racks pivotally connected to a pair of endless drive chains 14 and 16. The individual baking racks are preferably connected to the drive chains in such a manner as to permit them to freely swing or pivot throughout the processing of the pretzels. The endless drive chains 14 and 16 are continuously driven by a combination of motor 18 and gearing (not shown) in gear box 40 at a controlled rate through a series of processing stations. After the frozen pretzels have been placed on the rack 12, and the motor 18 actuated, the pretzels and the rack are moved by the cyclical action of the chains 14 and 16 to a first processing station where the pretzels are sprayed with a caustic soda solution by pressurized spray rod 20. The baking rack with the pretzels is then moved upwardly in an inclined plane until it is located in the salting station, comprising the rotating salter 22, which salts the wetted pretzels. The movement of the drive chains 14 and 16 is so timed that the pretzels are located under the salter 22 for a sufficient time to allow four rotations of the salter, thereby providing the pretzels with a uniform salting.

After the baking rack 12 passes through the salting station, it moves horizontally through a baking station which comprises a plurality of longitudinal heating rods 24—24 and an associated reflector 26, in combination with a plurality of transverse heating rods 28—28, each transverse baking rod having a specially adapted reflector. This combination of heating rods and reflectors results in a fast, uniform, and thorough baking of the pretzels. When the pretzels complete the baking operation, the rack 12 is again positioned at the front of the apparatus and the completed pretzels may be removed and immediately eaten.

Figure 2:
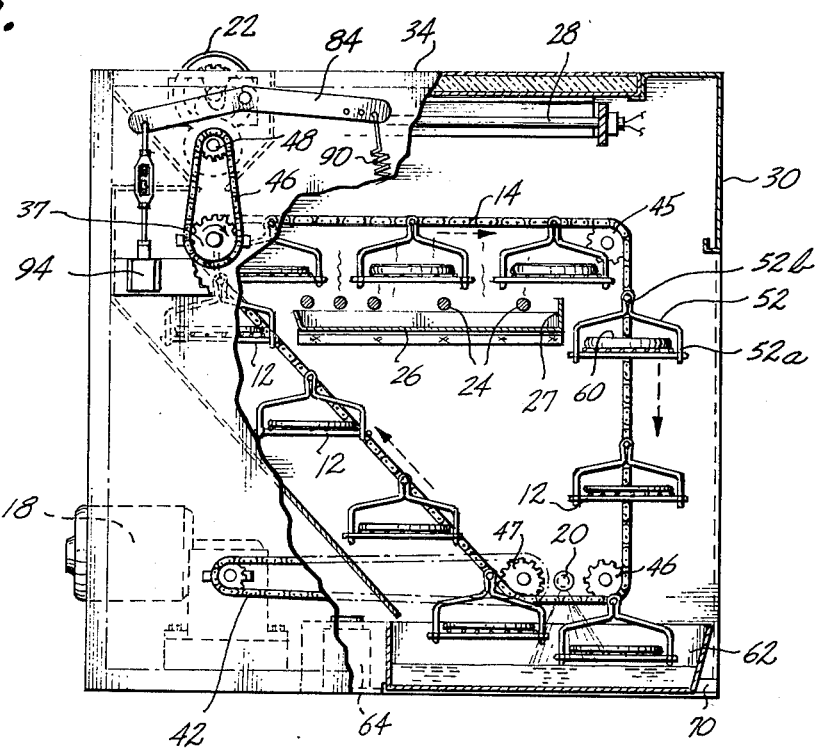
FIG. 2 is a left side elevation view of such a pretzel baking apparatus.
Figure 3:
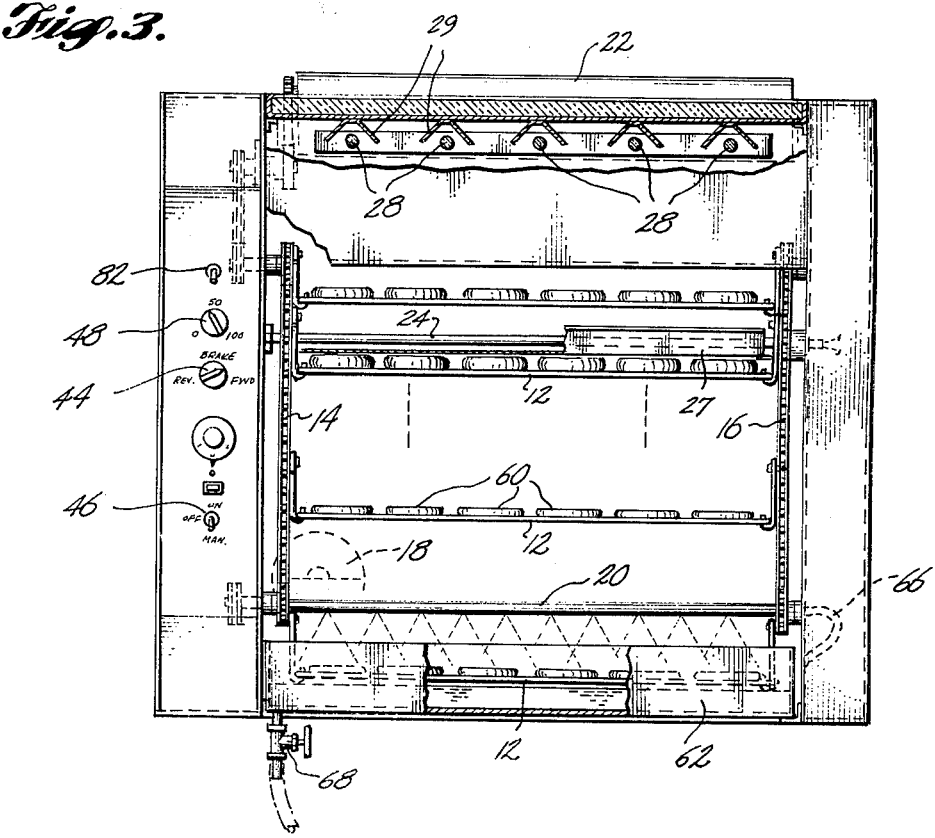
FIG. 3 is a front elevation view of such a pretzel baking apparatus.

Referring now to FIGS. 1, 2 and 3 in detail, the apparatus is partially enclosed by a frame 30 substantially square in outline, into which are positioned side panels 32, 33, back panel 35 and a top insulating panel 34 (FIG. 2). The front of the apparatus is left open to facilitate loading and unloading of the pretzels, as well as for stimulation of customer interest in the processed pretzels. Two endless chains 14 and 16 move the plurality of baking racks suspended therefrom through the various processing stations in the apparatus.

Endless chain 14 is supported in the outline roughly of a right-angle triangle parallel with and adjacent to side panel 32 by free turning gears 36, 37, 38, and 39, which are mounted on rods supported by a portion of frame 30 adjacent side panel 32, and include teflon bearings to minimize gear drag. This arrangement increases the compactness of the machine and reduces the time for completion of one revolution of the baking racks. Chain 14 is positively driven through double gear 36, having sets of teeth on each end thereof. One set of teeth 36a is connected to motor 18 through a gear box 40 and drive chain 42. Motor 18 and gear box 40 form a variable speed, reversible motor arrangement which is controlled by front panel switch 44 (FIG. 3). The baking racks may thus be moved forward or backward through the processing stations. The motor 18 is controlled via conventional front panel controls, including off-on control 46, forward-reverse control 44, and a variable speed control 48.

Chain 16 is not positively driven, but follows the movement of chain 14 through the connecting baking racks. Chain 16 is supported also in the outline roughly of a right-angle triangle parallel with and adjacent to side panel 33 by free turning gears 44, 45, 46, and 47 mounted via rods to the portion of frame 30 adjacent side panel 33. Each of the gears 44 through 47 includes a set of teeth for engagement with chain 16, and a teflon bearing to minimize friction where the gear structure mates with the supporting frame.

Connected pivotally between the two endless chains 14 and 16 are a plurality of baking racks. Each baking rack comprises a plurality of parallel, elongated bars extending longitudinally from chain 14 to chain 16, and connected at spaced intervals, including the ends thereof, with transverse bars of the same general size. Each of the longitudinal ends of the baking racks has attached thereto an inverted Y-shaped member 52, the two arms 52a and 52b of which are connected to the respective corners of each longitudinal baking rack end. The stem 52c of member 52 defines a small loop which may be conveniently positioned over a matching protrusion 54 affixed to the endless chains 14 and 16 at regular intervals. The Y-shaped members 52 are prevented from coming off the protrusions 54 by means of a tension clip, (not shown) which is spread open for insertion on the protrusion, and when released, springs back to fit around the protrusion 54 sufficiently tight to prevent the stem 52c of the Y-shaped member 52 from slipping off. This arrangement allows the baking racks to pivot about two opposing protrusions on chains 14 and 16, such that the racks tend to remain horizontal, and thereby support the pretzels, regardless of the orientation of the two endless chains 14 and 16. The baking racks are typically either coated with teflon or have thin pierced teflon sheets positioned thereon to prevent the pretzels from adhering to the baking racks during processing of the pretzels.

After the raw, frozen pretzels 60, approximately 3 inches by 5 inches by ½ inch thick, are placed on a baking rack 12 at the front of the apparatus, the baking rack 12, when motor 18 is actuated, will move in a direction shown by the arrows (FIG. 3) into the spraying station area. The pretzels are moved directly under hollow spray bar 20, which extends longitudinally of the apparatus, from chain 14 to chain 16, and which has a plurality of holes defined therein, primarily on the underside of the spray bar 20 facing the pretzels.

A caustic soda solution is introduced into the hollow spray bar by pump 64, which is connected to bar 20 by flexible tube 66. The pump 64 is connected to a soda solution reservoir (not shown) typically located at the rear of the apparatus and, in operation, pumps the soda solution under pressure into hollow spray bar 20, from which it is forced out in a uniform, fine spray over the exposed pretzels on the baking rack, substantially coating the exposed surface of the individual pretzels with the soda solution. Any run-off of the soda solution from the pretzels or any spray not impinging on the pretzels is collected in catch tray 62. Catch tray 62 is conveniently supplied with a controlled drain 68, which can be used to drain the bulk of run-off solution from the tray 62. The tray 62 rests on runner members 70 which are located at opposing edges of the frame 30, and permit easy insertion and removal of the tray 62 for cleaning or repair.

Figures 4, 5:
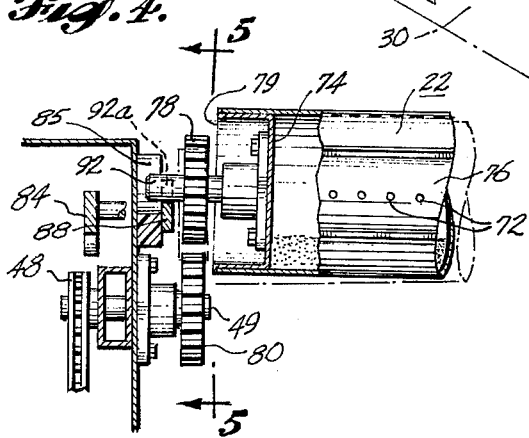
FIG. 4 is a part section view showing the salter gearing of the pretzel baking apparatus in front elevation.
FIG. 5 is a section view of the salter gearing taken along line 5—5 in FIG. 4.

Referring to FIGS. 1, 4 and 5, the pretzels 60 are moved by the chains 14 and 16 from the spraying station into the salting station area. The salter 22 includes a closed cylinder 22a with a single longitudinal row of openings 72 located therein, allowing the salt contained within the cylinder 22a to fall out during rotation onto pretzels. The cylinder 22a is filled with salt by first removing removable cap 74 at one end of the cylinder 22a (FIG. 4). The size of the openings 72 may be varied by slightly moving longitudinal strip 76, which abuts cylinder 22a and includes a series of openings which are coincident with openings 72 in cylinder 22a. The movement of strip 76 slightly mismatches the otherwise aligned openings in the strip 76 and the cylinder 22a. This feature allows the quantity of salt falling from the cylinder 22a during a rotation thereof to be varied by the operator.

The salter 22 is positively driven from motor 18 through double ended gear 37. As gear 37 is rotated because of the engagement of one set of teeth 37a with endless chain 14, the other set of teeth 37b rotates therewith, driving endless chain 46. The movement of chain 46 rotates gears 48 and 80, which are connected to a common axle 49. Gear 80 is then selectively engaged with coplanar salter drive gear 78 by means to be more fully explained in following paragraphs. Salter drive gear 78 is fixedly connected to cylinder 22a, so that rotation of drive gear 78 rotates the cylinder 22a in conjunction therewith. The salter gearing is arranged such that the salter cylinder 22a revolves four times for every revolution of gear 37. This salter rotation speed allows for between 2 and 4 salting operations to occur for each rack of pretzels. Furthermore, the cylindrical shape of the salter, in combination with the rotation speed described above, results in a more uniform and complete distribution of salt over the pretzels, and substantially eliminates the effect of "salt dust", which are extremely fine particles of salt caused by frictional interaction of the salt particles during salting, a characteristic of prior art pretzel salting mechanisms.

Referring now to FIGS. 4 and 5, showing the details of the salter drive circuit, the cylindrical salter 22a as explained above is driven by the gear 80 engaging with gear 78, which is secured to one end 79 of cylinder 22a. Gear 80 is connected by common axle 49 with gear 48, which is positively rotated by chain 46 operating off gear 37 (FIG. 1).

A control switch 82 on the front panel controls an engaging circuit to engage gears 78 and 80 for salter rotation. The engaging circuit includes an engaging lever 84, which is connected to notched plate 85 and notched arm 88 by pivot pin 86. Engaging lever 84, and notched arm 88 pivot about pivot pin 86. Notched arm 88 is located between notched plate 85 and gears 78 and 80. Engaging lever 84 is normally held in one position by spring 90, which tends to pull end 84a of engaging lever 84 down, thereby forcing the notched portion 88a of notched arm 88 up against fixed center rod 92 of salter 22. Center rod 92 has gear 78 positioned thereon, end 92a of which rod rides in the notch of notched plate 85, and the notched portion 88a of notched arm 88. The other end 92b of rod 92 is positioned in fixed plate 95. When notched portion 88a is held up by the tension of spring 90, the center rod 92, and hence, the salter 22 itself is moved upward, and gear 78 is moved out of engagement with gear 80. When the salter switch 82 is activated, however, current is applied to solenoid 94, which forces end 84b of engaging lever 84 downward toward solenoid 94, thus pivoting notched arm 88 downward through pivot pin 86. The lowering of the notched portion 88a of notched member 88 permits center rod 92 to move downward, and hence allows gear 78 to come into engagement with the gear 80. Since gear 80 is turning coincidentally with gear 48 whenever the motor 18 is operating, activation of the salter control switch 82 when the motor 18 is on will result in rotation of the salter and salting of the pretzels. Thus, the need for a separate salter motor is eliminated, and a more reliable and efficient salting apparatus is achieved.

After the pretzels have been salted, they are moved by endless chains 14 and 16 into the baking station of the apparatus. The baking station comprises five longitudinal Cal rods 24—24 which extend in the same longitudinal direction as the baking racks and are located directly below the path of travel of the pretzels, in combination with a removable reflector plate 26, and five transverse infra-red quartz rods 28—28 in combination with individual reflectors 29—29. The five horizontally disposed Cal rods 24—24 are each 1000 watts, extend the full width of the apparatus, and are conventionally energized through individual wire connections. They are held in place by conventional bracket members 24a—24a. Cal rods 24—24 are utilized to bake the bottom portion of the pretzels. A horizontally disposed combination clean-out tray and reflector plate 26 is provided beneath the Cal rods 24—24 so as to make efficient use of the available heat and to catch any particles or drippings from the racks of pretzels. The tray 26 is positioned a few inches below the Cal rods 24—24 and extends sufficiently longitudinally and transversely to be beneath all of the Cal rods. Tray 26 has a lip 27 which extends around the circumference thereof to keep any material from the pretzels from spilling out.

Located substantially normally to the Cal rods and several inches above the slowly-moving baking racks are the five spaced infra-red quartz rods 28—28. Again, the quartz rods are conventionally energized through wire leads and are each 1000 watts. The quartz rods serve an important and distinctive purpose in the processing apparatus insofar as they bake the upper portion of the pretzels and aid in imparting to the upper surface of the pretzels the unique light brown color that adds considerably to the appeal of the pretzels. Conventional baking means would be sufficient to adequately bake the pretzels, but the quartz rods additionally provide the distinctive color to the surface of the soda-sprayed pretzels. Each of the quartz rods has an associated inverted trough-shaped reflector 29—29 (FIG. 3) positioned above the quartz rods, which reflectors aid in directing radiation from the individual quartz rod toward the surface of the moving pretzels. The pretzels are quickly and uniformly baked and browned by this arrangement of heating elements. At this point, the pretzels have been sprayed with a solution, salted, and fully browned and baked. They are then moved out of the baking station area to the front of the machine (FIG. 2) where they are easily visible, and where the individual finished pretzels may be conveniently retrieved from the moving racks by the operator. As the now empty racks descend at the front of the machine, they are again ready to be loaded with raw frozen pretzels and the process repeated. The entire process requires on the order of 11 minutes, which is a substantial time savings over prior art machines. Thus, a pretzel processing apparatus has been disclosed which utilizes a novel arrangement of spraying, salting, and baking apparatus to produce high quality, soft pretzels in a reduced time from the prior art.

Although an exemplary embodiment of the invention has been disclosed herein for purposes of illustration, it will be understood that various changes, modifications, and substitutions may be incorporated in such embodiment without departing from the spirit of the invention as defined by the claims which follow. For instance, the drive chains used in the preferred embodiment can be any type of endless belts, with appropriate corresponding support structure.

What is claimed is:

1. An apparatus for baking a pretzel-like bakery product, comprising:
   a housing having an oven-like chamber therein;
   a pair of endless power-driven drive belts mounted in the chamber so as to rotate therein in spaced parallel vertical planes around closed paths of travel each comprising a first substantially horizontal segment disposed near the top of the chamber, a second substantially horizontal segment disposed near the bottom of the chamber, said second horizontal segment being substantially shorter than said first horizontal segment, each of said first and second horizontal segments having first and second ends, said closed paths of travel further including a substantially vertical segment and an oblique segment, said vertical segment being disposed adjacent the front of the chamber and connecting the respective first ends of said first and second horizontal segments, said oblique segment being disposed towards the rear of the chamber and connecting the respective second ends of said first and second horizontal segments;
   a plurality of carrier racks interposed between the drive belts and swingably supported at spaced points therealong so that a baking surface of each rack maintains a substantially horizontal disposition as the racks are rotated in conjunction with the drive belts, said baking surface of the racks being adapted to support a bakery product;
   means positioned in said housing for spraying a solution on the bakery product when each rack is disposed at a point near the bottom of the vertical segments of the closed paths of travel of the drive belts;
   means positioned in said housing for salting the upper surface of the bakery product at a point in the course of travel thereof after each rack has passed said spray point; and
   dual baking means disposed above and below the course of travel of said racks at a point after said salting point for baking the bakery products.

2. An apparatus of claim 1, including means for driving said drive belts, said driving means including means for reversing the direction of rotation of said drive belts such that said plurality of carrier racks may be moved in either rotational direction in said spaced vertical planes, and further including means for varying the speed of rotation of said drive belts.

3. An apparatus of claim 2, wherein said salting means is adapted to be selectively coupled to said drive means such that said salting means is rotated in conjunction with the movement of said drive belts, when so coupled.

4. An apparatus of claim 3, including means for selectively engaging said salting means with said drive means.

5. An apparatus of claim 4, wherein said salting means includes a rotatable hollow cylinder, wherein said hollow cylinder has defined therein a plurality of openings permitting salt to fall onto said bakery products when said hollow cylinder is in a predetermined orientation.

6. An apparatus of claim 5, wherein said engaging means includes a first gear fixedly attached to one end of said hollow cylinder and a second gear positioned so as to be substantially coplanar therewith, said second gear being positively driven by said driving means, and including means for moving said one end of said hollow cylinder between two operative positions, said first operative position being such that said first and second gears are interengaged, and said second operative position being such that said second gear rotates without engaging said first gear.

7. An apparatus of claim 2, including a plurality of supporting gear means mounted in said chamber for supporting said drive belts along their respective closed paths of travel, each of said plurality of gear means being adapted to mesh with said drive belts, said apparatus further including means connecting said driving means to at least one of said plurality of gear means for rotation thereof to accomplish subsequent rotation of said drive belts through said closed paths of travel.

8. An apparatus of claim 1, wherein said spraying means includes means operative to maintain said solution in said spraying means under a predetermined pressure.

9. An apparatus of claim 8, wherein said spraying means includes a hollow, elongated tube coupled to said pressure maintaining means, said hollow tube including a plurality of spaced openings located therein along the length thereof permitting explusion of the solution onto the upper portion of said bakery product, said hollow tube being disposed substantially parallel with said carrier racks and between said spaced belts in the vicinity of the bottom of said vertical segments such that said carrier racks pass directly beneath said spraying means in their course of travel.

10. An apparatus of claim 1, wherein each of said carrier racks has a plurality of openings defined therein and includes a pair of connector means attached to each longitudinal end thereof, said connector means having an opening which is so configured so as to permit said connector means to be positioned over a corresponding projection fixedly secured to said drive belts.

11. An apparatus of claim 1, wherein said dual means includes a plurality of heating elements positioned a predetermined distance above and below said carrier racks as said carrier racks move through the horizontal segments of the belts in their course of travel.

12. An apparatus of claim 11, wherein said heating elements include a plurality of infra-red quartz heating rods positioned above said horizontal segments, said infra-red quartz rods generating, when energized, radiation which bakes the bakery product and reacts with said solution on the bakery products to brown the bakery products.

13. An apparatus of claim 12, wherein each of said plurality of infra-red quartz heating rods has positioned above it a shaped reflector means for reflecting radiation from said quartz heating rods in the direction of said bakery products.

14. An apparatus for baking a pretzel-like bakery product, comprising:
   a. a housing having an oven-like chamber therein;
   b. a pair of endless power-driven belts mounted in the chamber so as to rotate therein in spaced parallel vertical planes around closed paths of travel each comprising a first substantially horizontal segment disposed near the top of the chamber, a second substantially horizontal segment disposed near the bottom of the chamber, said second horizontal segment being substantially shorter than said first horizontal segment, each of said first and second horizontal segments having first and second ends, said closed paths of travel further including a substantially vertical segment and an oblique segment, said vertical segment being disposed adjacent the front of the chamber and connecting the respective first ends of said first and second horizontal segments, said oblique segment being disposed towards the rear of the chamber and connecting the respective second ends of said first and second horizontal segments;

c. means for driving said drive belts, said driving means including means for reversing the direction of rotation of said drive belts such that said plurality of carrier racks may be moved in either rotational direction in said spaced vertical planes, including means for varying the speed of rotation of said drive belts;

d. a plurality of supporting gear means mounted in said chamber for supporting said drive belts along their respective closed paths of travel, each of said plurality of gear means being adapted to mesh with said drive belts, said gear means including means connecting said driving means to at least one of said plurality of gear means for rotation thereof to accomplish subsequent rotation of said drive belts through said closed paths of travel;

e. a plurality of carrier racks interposed between the drive belts, and swingably supported at spaced points therealong so that a baking surface of each rack maintains a substantially horizontal disposition as the racks are rotated in conjunction with the drive belts, said baking surface of the racks being adapted to support a bakery product;

f. means positioned in said housing for spraying a solution on the bakery product when each rack is disposed at a point near the bottom of the vertical segments of the closed paths of travel of the drive belts;

g. means positioned in said housing for salting the upper surface of the bakery product at a point in the course of travel thereof after each rack has passed said spray point, including means for selectively engaging said salting means with said driving means, such that said salting means is rotated in conjunction with the movement of said drive belts when so engaged, said salting means further including a rotatable hollow cylinder, wherein said hollow cylinder has defined therein a plurality of openings permitting salt to fall onto said bakery product when said hollow cylinder is in a predetermined orientation; and h. dual baking means disposed above and below the course of travel of said racks at a point after said salting point for baking the bakery products, said dual baking means including a plurality of heating elements positioned a predetermined distance above and below said carrier racks as said carrier racks move through the first horizontal segments in their respective paths of travel.

* * * * *